United States Patent
Choi et al.

(10) Patent No.: US 8,040,908 B2
(45) Date of Patent: Oct. 18, 2011

(54) METHOD AND APPARATUS FOR REDUCING TRANSMISSION DELAY OF DOWN-LINK FRAME IN WIRELESS COMMUNICATION SYSTEM

(75) Inventors: Jin-Hyeock Choi, Suwon-si (KR); Greg Daley, Clayton (AU); Yasar Ahmet Sekercioglu, Clayton (AU)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 11/580,886

(22) Filed: Oct. 16, 2006

(65) Prior Publication Data

US 2007/0189253 A1    Aug. 16, 2007

Related U.S. Application Data

(60) Provisional application No. 60/772,877, filed on Feb. 14, 2006.

(30) Foreign Application Priority Data

May 17, 2006    (KR) .................. 10-2006-0044437

(51) Int. Cl.
    *H04L 12/56* (2006.01)
(52) U.S. Cl. ............... 370/414; 370/338; 370/395.42; 370/412; 455/435.3
(58) Field of Classification Search .......... 370/395.42, 370/412, 338, 414, 395; 455/435.3
See application file for complete search history.

(56) References Cited

U.S. PATENT DOCUMENTS

| | | | | |
|---|---|---|---|---|
| 6,115,390 | A | * | 9/2000 | Chuah .................. 370/443 |
| 6,137,787 | A | * | 10/2000 | Chawla et al. ............ 370/337 |
| 6,684,354 | B2 | | 1/2004 | Fukushima et al. |
| 7,366,775 | B2 | * | 4/2008 | Taylor .................. 709/224 |
| 2001/0036157 | A1 | * | 11/2001 | Blanc et al. ............ 370/235 |
| 2002/0137521 | A1 | | 9/2002 | Kim et al. |
| 2004/0090943 | A1 | * | 5/2004 | da Costa et al. .......... 370/338 |
| 2004/0102932 | A1 | * | 5/2004 | Fukushima et al. ........ 702/189 |

FOREIGN PATENT DOCUMENTS

| | | |
|---|---|---|
| JP | 60-244154 | 12/1985 |
| JP | 63-287152 | 11/1988 |
| JP | 2000-059346 | 2/2000 |
| JP | 2000-216813 | 8/2000 |
| KR | 10-2001-0035467 | 5/2001 |
| KR | 10-2005-0082499 | 8/2005 |
| KR | 10-2005-0089756 | 9/2005 |

* cited by examiner

*Primary Examiner* — Nick Corsaro
*Assistant Examiner* — Quan Hua
(74) *Attorney, Agent, or Firm* — NSIP Law

(57) ABSTRACT

A method and apparatus for reducing a transmission delay of a downlink frame in a wireless communication system are provided. A frame transmission method in an access point (AP) includes classifying each of a plurality of hosts as any one of a normal destination and a suspect destination according to whether a retransmission is exhausted, and managing at least one frame to be transmitted to each of the normal destination and the suspect destination in a first queue and a second queue, and assigning at least one frame transmission attempt to the first queue and the second queue according to a transmission priority.

23 Claims, 6 Drawing Sheets

DESTINATION CLASSIFICATION

| NORMAL | SUSPECT |
|---|---|
| SECOND HOST THIRD HOST ⋮ | FIRST HOST ⋮ |

METHOD AND APPARATUS FOR REDUCING TRANSMISSION DELAY OF DOWN-LINK FRAME IN WIRELESS COMMUNICATION SYSTEM

CROSS-REFERENCE TO RELATED APPLICATIONS

This application claims the benefit under 35 U.S.C. §119 (e) of an U.S. Provisional Application No. 60/772,877, filed on Feb. 14, 2006, in the U.S. Patent and Trademark Office, and under 35 U.S.C. §119(a) of a Korean Patent Application No. 10-2006-0044437, filed on May 17, 2006, in the Korean Intellectual Property Office, the entire disclosure of both of which are hereby incorporated by reference.

BACKGROUND OF THE INVENTION

1. Field of the Invention

The present invention relates to a wireless communication system. More particularly, the present invention relates to a method and apparatus for transmitting a downlink frame by using two queues according to a successful transmission probability to a destination in a wireless communication system according to Institute of Electrical and Electronics Engineers (IEEE) 802.11, wireless local area network (WLAN), IEEE 802.16d/e, wireless broadband Internet (WiBro), and World Interoperability for Microwave Access (WiMAX), and the like and thereby, reducing a transmission delay of the downlink frame.

2. Description of Related Art

A fourth generation mobile communication unifies systems, such as IEEE 802.11, WLAN, IEEE 802.16d/e, WiBro, and WiMAX, and the like. In the fourth generation mobile communication, satellite networks, wireless networks, digital broadcasting networks, and video broadcasting networks are unified into a single network, and systematically interoperate with each other. Accordingly, a user may utilize a communication service such as a portable Internet service in a best state, with any network.

FIG. 1 is a diagram illustrating a conventional wireless communication system 100 environment. Referring to FIG. 1, a first host 130, a second host 140, and a third host 150 may receive a communication service, such as a call, digital broadcasting, downloading or uploading of digital medial data, and the like, via an access point (AP) 120. The first host 130, the second host 140, and the third host 150 may be a mobile phone, a notebook computer, a personal digital assistant (PDA), and the like. The AP 120 and an access router (AR) 110 are connected to each other, based on an Ethernet protocol. The AP 120 functions as a bridge for a fast connection to a host. Also, the AP 120 functions to process scheduling of wireless resources and a radio frequency (RF) control function. The AR 110 is an Internet Protocol (IP) terminating point which is mainly in charge of a layer 3 (L3), and routes IP packets so that the IP packets may be appropriately transmitted and received between the AP 120 and each of the first host 130, the second host 140, and the third host 150. The IP packets are transmitted to or received from a destination host or a destination server via the AP 120.

In the conventional wireless communication system 100 environment, the AP 120 manages a queuing unit 121, and transmits downlink frames P1, P2, P3, . . . , in a packet format, from an upper layer, such as the AR 110, to a corresponding host. For example, the frame P1 is transmitted to the first host 130, the frame P2 to the second host 140, and the frame P3 to the third host 150. In addition, the AP 120 consecutively receives frames from the upper layer and transmits the frames to a corresponding destination.

However, in the conventional wireless communication system 100 according to IEEE 802.11, WLAN, and the like, the AP 120 manages only the single queuing unit 121. Accordingly, when a transmission of a frame fails, a retransmission of the frame is attempted for a certain number of cycles. For example, as shown in FIG. 2, when a transmission of the frame P1 fails during a cycle due to a communication error with the first host 130, the AP 120 attempts a retransmission of the frame P1 during subsequent cycles. In this case, when a total number of transmission attempts becomes a certain value, for example, 7 times, but the transmission of the frame P1 fails within a time T1, the AP 120 discards the frame P1. Subsequent frames P2, P3, . . . , which are waiting to be transmitted after the frame P1, are transmitted. In this case, when it is assumed that a communication between the second host 140 and the third host 150 is good and each of the frames P2 and P3 is transmitted in only one cycle, i.e. T2 and T3, the second host 140 and the third host 150 which respectively receive the frames P2 and P3 experience a service deterioration due to a transmission delay during the time T1. In the above example, transmission delays from a transmission attempt starting time are 7 cycles for the frame P1, 8 cycles for the frame P2, and 9 cycles for the frame P3. In this case, the average of the transmission delays is (7+8+9)/3=8 cycles.

In the above example, in the case of a communication interruption with the second host 140 or the third host 150, the transmission delay may not be worse than the communication interruption with only the first host 130. However, a frame which has a comparatively low successful transmission probability in a transmission waiting line of the queuing unit 121, for example, a transmission of subsequent frames P2 and P3 may be considerably delayed.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method of reducing a transmission delay by classifying hosts as a normal destination or a suspect destination according to a successful transmission probability of downlink frames in an access point (AP), and assigning a different transmission priority according to the classification of the destinations.

An aspect of exemplary embodiments of the present invention provides an apparatus for assigning different transmission priorities to downlink frames for each destination according to a successful transmission probability, so as to reduce a transmission delay of the downlink frames in an AP.

According to an aspect of exemplary embodiments of the present invention, a frame transmission method in an access point includes classifying each of a plurality of hosts as any one of a normal destination and a suspect destination according to whether or not a retransmission is exhausted, and managing at least one frame to be transmitted to each of the normal destination and the suspect destination in a first queue and a second queue, and assigning at least one frame transmission attempt to the first queue and the second queue according to a transmission priority.

According to another aspect of exemplary embodiments of the present invention, a frame transmission method includes transferring at least one frame to be transmitted to a normal destination that is a host which maintains a good communication, to a first queue, transferring at least one frame to be transmitted to a suspect destination that is a host which maintains a poor communication, to a second queue; performing a transmission attempt with respect to the frame of the first queue, and performing the transmission attempt with respect to the frame of the second queue, before or after performing the transmission attempt with respect to the frame of the first queue.

According to still another aspect of exemplary embodiments of the present invention, a frame transmission apparatus includes a primary queuing unit for managing at least one frame to be transmitted to a normal destination that is a host which maintains a good communication, in a first queue, and transmitting the at least one frame, and a retransmission queuing unit for managing at least one frame to be transmitted to a suspect transmission that is a host which maintains a poor communication in a second queue, and transmitting a frame managed in the second queue before or after the primary queuing unit performs the transmission attempt with respect to a frame of the first queue.

In an exemplary implementation, the frame transmission apparatus may further include a control unit for classifying each of a plurality of hosts attached to an AP as any one of the normal destination and the suspect destination according to whether or not a retransmission is exhausted.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 3:
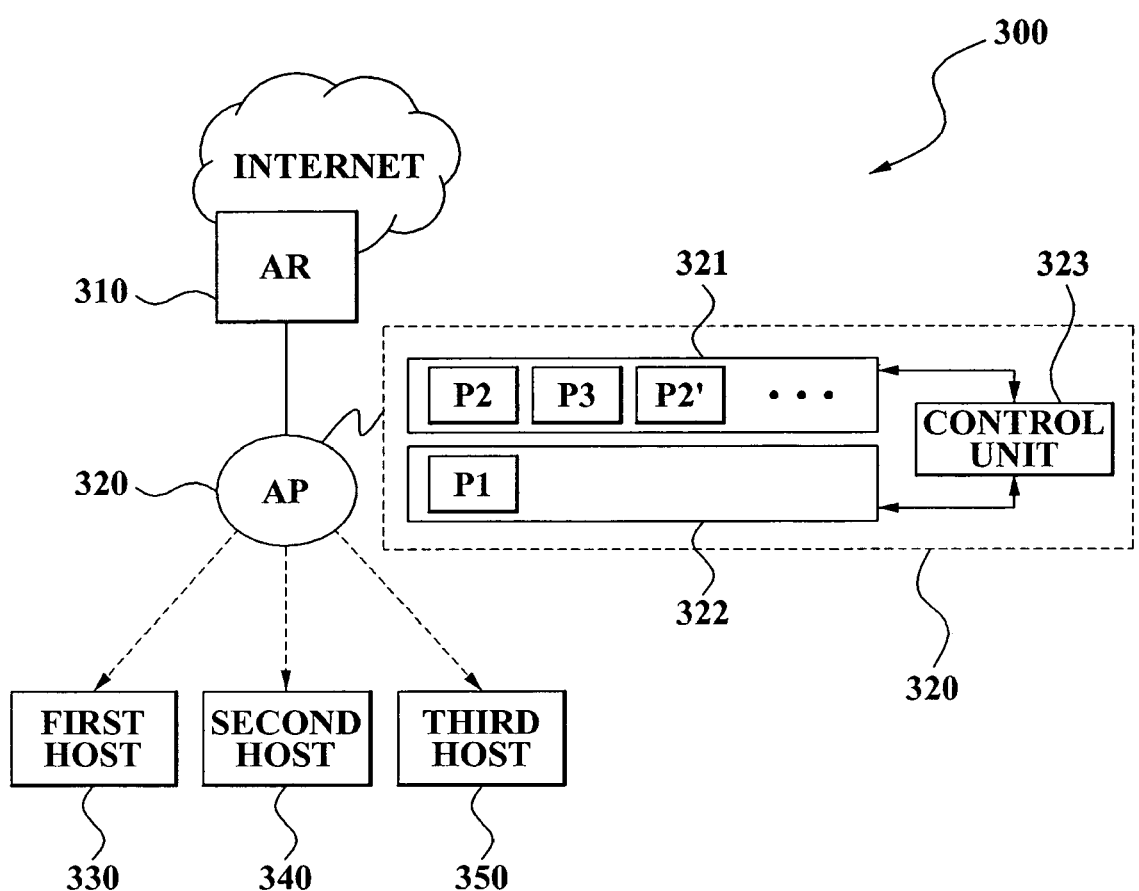
FIG. 3 is a diagram illustrating a wireless communication system according to an exemplary embodiment of the present invention.

FIG. 3 is a diagram illustrating a wireless communication system 300 according to an exemplary embodiment of the present invention. Referring to FIG. 3, the wireless communication system 300 includes an access router (AR) 310, an access point (AP) 320, and hosts, such as a first host 330, a second host 340, and a third host 350.

The first host 330, the second host 340, and the third host 350 may correspond to a mobile phone, a notebook computer, a personal digital assistant (PDA), and the like, and may also communicate with a correspondent node via the AR 310 and the AP 320 which are connected to an Internet network. Here, the Internet network includes both a private access network and a public access network. For example, the AR 310 which is connected to the Internet network controls a session connection establishment of an incoming call. Also, the AR 310 manages routing so that an Internet Protocol (IP) packet or a message between the AP 320 and each of the first host 330, the second host 340, and the third host 350 may be appropriately transmitted and received. The AR 310 may interoperate with a home agent (HA) on the Internet, which performs a mobile IP registration allocation and a data encapsulation function. In addition, an Authentication/Authority/Accounting (AAA) server, a quality manager, a location register, an application server, and the like, may be connected to the AR 310 via the Internet network.

The AP 320 performs a Radio Resource Control (RRC) function according to scheduling of wireless resources and a handoff function supporting mobility between cells, and thereby, relays a communication of the first host 330, the second host 340, and the third host 350.

The wireless communication system 300 may be applied to a system such as IEEE 802.11, WLAN, IEEE 802.16d/e, WiBro, and WiMAX. In the wireless communication system 300, the AP 320 supports seamless mobility of the first host 330, the second host 340, and the third host 350 according to an IP, for example, an Internet Protocol version 6 (IPv6).

Particularly, in the present exemplary embodiment, when the AP 320 transmits downlink frames to the first host 330, the second host 340, and the third host 350, the first host 330, the second host 340, and the third host 350 are classified into a normal destination or a suspect destination according to a successful transmission probability. Also, a transmission priority is assigned to each of the downlink frames for each destination. Accordingly, the average of transmission delays may be reduced. Downlink frames P1, P2, P3, . . . , which are transmitted from the AP 320, designate a Media Access Control (MAC) frame, and include a header, data, and a trailer. The frame structure is well-described in protocols such as IPv6.

In the present exemplary embodiment, downlink frames are managed in different queuing units for each destination. For example, in FIG. 3, the AP 320 includes two queuing units, a primary queuing unit 321 and a retransmission queuing unit 322. Also, the AP 320 may include a control unit 323 to control the primary queuing unit 321 and the retransmission queuing unit 322. Frames to be transmitted to the normal destination are managed in the primary queuing unit 321. Other frames to be transmitted to the suspect destination are managed in the retransmission queuing unit 322.

Figures 4, 5:
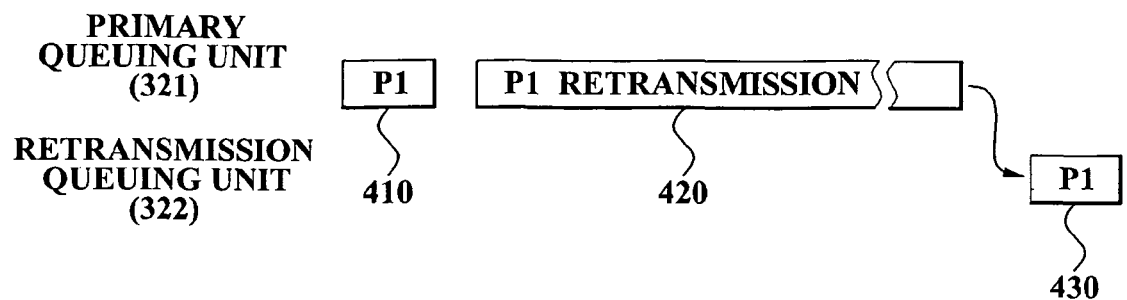
FIG. 4 is a diagram illustrating a process of determining a suspect destination according to an exemplary embodiment of the present invention.
FIG. 5 is a diagram illustrating a destination classification table according to an exemplary embodiment of the present invention.

The control unit 323 may classify each of a plurality of hosts, for example, the first host 330, the second host 340, and the third host 350, which are attached to the AP 320, as any one of the normal destination or the suspect destination according to whether a retransmission is exhausted. As an example, a downlink frame, for example, the frame P1, to be transmitted to the first host 330 is transferred to a queue of the primary queuing unit 321 as shown in FIG. 4. In this case, the primary queuing unit 321 attempts a transmission of the frame P1 during an initial cycle 410. When it is assumed that the AP 320 maintains a poor communication with the first host 330 due to an interruption, the transmission of the frame P1 may be attempted, but may not be transmitted during the initial cycle 410. When the transmission of the frame P1 fails during the initial cycle 410, the primary queuing unit 321 attempts a retransmission of the frame P1 during subsequent predetermined cycles 420 like FIG. 4. When retransmission attempts are exhausted, but the frame P1 is not transmitted to the first host 330 during total transmission cycles, for example, 7 cycles, the control unit 323 classifies the first host 330 as the suspect destination. The frame P1 may be assigned to the retransmission queuing unit 322 in a location 430.

As described above, the suspect destination designates a host which maintains a communication error. Reasons for the communication error includes all the interruptions where a good communication with a correspondent node may not be maintained, such as a system error of a host or an AP equipment, and noise or interference which is caused by topography, buildings, trees lining a street, and the like.

As shown in FIG. 5, the control unit 323 classifies the first host 330 as the suspect destination which maintains a poor communication, and also classifies the second host 340 and the third host 350 as the normal hosts which maintain a good communication, using the above-described method.

Accordingly, the control unit 323 may control the frames to be transmitted to the normal destination, to be managed in a first queue of the primary queuing unit 321. Also, the control unit 323 may control the frames to be transmitted to the suspect destination to be managed in a second queue of the retransmission queuing unit 322. Also, the control unit 323 assigns a frame transmission attempt to each of the first queue and the second queue according to a predetermined transmission priority. In the present exemplary embodiment, the first queue and the second queue may be predetermined memory storing frames, for example, memory in a first-in first-out (FIFO) type.

The control unit 323 may assign the transmission priority to the first queue and the second queue, based on a round robin method. For example, a highest priority may be assigned to each of frames managed in the first queue and frames managed in the second queue, alternating for each cycle. In this case, a weight may be assigned to the priority of the first queue and the second queue. For example, the highest priority may be assigned to frames managed in the first queue of the primary queuing unit 321, alternating for each of two, three, four, . . . cycles. Also, the next highest priority may be assigned to frames managed in the second queue of the retransmission queuing unit 322 for the only one cycle.

Hereinafter, an operation of the primary queuing unit 321 and the retransmission queuing unit 322 according to an exemplary embodiment of the present invention will be further described in detail with reference to FIG. 6.

As described above, the control unit 323 separates the frames to be sent to the normal destination and the suspect destination, and controls transmission attempts of the downlink frames to the first host 330, the second host 340, and the third host 350, according to the normal destination and the suspect destination. In FIG. 6, it is assumed that the normal destination and the suspect destination were determined, and frame transmission attempts were sequentially assigned in an order of the frame P1 to the first host 330, the frame P2 to the second host 340, and the frame P3 to the third host 350, and a subsequent frame P2' to the second host 340. This may be also applied to when the transmission of the frame P1 to the first host 330 occurred after transmitting the frame P2 to the second host 340, the transmission of the frame P3 to the third host 350, or the transmission of the subsequent frame P2' to the second host.

For example, a frame transmission attempt to the first host 330 is assigned to the frame P1 which is transferred to the second queue, in a location 610, during a single cycle. In this case, since the first host 330 corresponds to the suspect destination, a transmission failure of the frame P1 is anticipated. The transmission of the frame P1 failed, and a retransmission attempt of the frame P1 is also expected to be a failure. Accordingly, the retransmission attempt may not be assigned to the frame P1 and thereby, a transmission delay may be reduced.

Also, a transmission attempt to the second host 340 is assigned to the frame P2 which is transferred to the first queue, in a location 620. The transmission attempt may be assigned with respect to the first queue of the primary queuing unit 321 for only a single cycle. However, according to circumstances, when the transmission attempt failed during the initial cycle, the retransmission attempt may be further assigned during predetermined cycles. Since the second host 340 corresponds to the normal destination, a frame transmission attempt may fail during an initial cycle, but a successful transmission by the retransmission attempt may be confidently predicted. Accordingly, it is assumed that the frame P2 in the location 620 is normally transmitted to the second host 340 during the initial cycle or via the retransmission attempt.

Also, the transmission attempt to the first host 330 is assigned to the frame P1 in a location 630 for a single cycle. In this case, since the first host 330 corresponds to the suspect destination, a transmission failure of the frame P1 is predicted. As described above, even when the transmission attempt of the frame P1 was a failure, the retransmission attempt may not be assigned.

The transmission attempt to the third host 350 is assigned to the frame P3 in a location 640 of the first queue. In this case, since the third host 350 corresponds to the normal destination, the frame P3 in the location 640 may be normally transmitted to the third host 350 during the initial cycle or via the retransmission attempt, using the above-described method.

The transmission attempt to the first host 330 is assigned to the frame P1 in a location 650 for only a single cycle, and the frame P2' of the first queue is transmitted to the second host 340 in a location 660, using a similar method to the above-described method.

The process as described above is repeated in turn with respect to the first queue and the second queue according to a transmission priority, such as a round robin method. The transmission of the frame P1 was attempted several times in the locations 610, 630, 650, 670, . . . , but when the frame P1 fails even during a predetermined total number of cycles, for example, 7 cycles, the frame P1 may be discarded from the second queue. Also, when the transmission of the frame P1 was attempted in the locations 610, 630, 650, 670, . . . , and the frame P1 was successfully transmitted to the first host 330, the first host 330 may be returned to the normal destination.

Also, when transmission of the frames of the first queue failed in locations 620, 640, 660, . . . , a corresponding host may be classified as the suspect destination at any time, as described above with reference to FIG. 4.

As described above, the primary queuing unit 321 may manage at least one frame to be transmitted to the normal destination, a host which maintains a good communication, in the first queue, and transmit the at least one frame. Also, the retransmission queuing unit 322 may manage at least one frame to be transmitted to the suspect transmission, a host which maintains a poor communication in the second queue, and transmit the frame managed in the second queue before or after the primary queuing unit 321 performs the transmission attempt with respect to the frame of the first queue.

Figure 7:
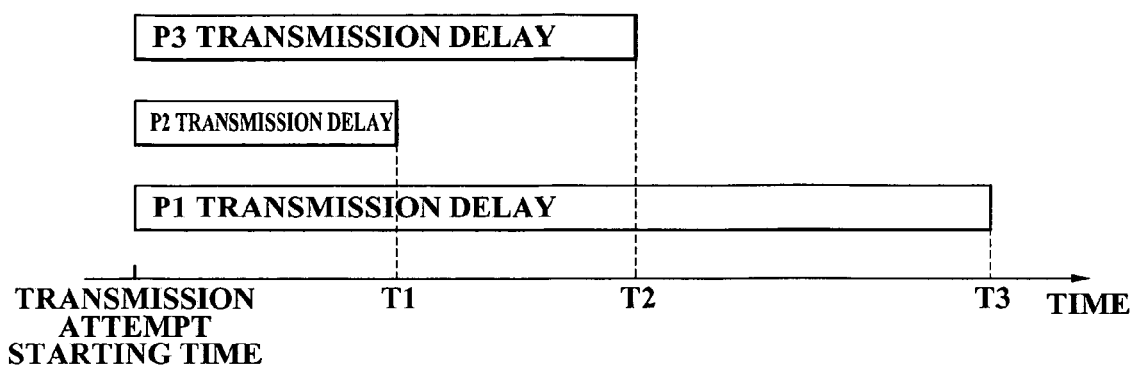
FIG. 7 is a diagram illustrating a transmission delay of a downlink frame in a wireless communication system according to an exemplary embodiment of the present invention.

FIG. 7 is a diagram illustrating a transmission delay of a downlink frame in the wireless communication system 300 according to an exemplary embodiment of the present invention.

In a frame transmission method according to an exemplary embodiment of the present invention, when the frame P1 starts being transmitted, but is not transmitted during a single cycle due to a poor communication with the first host 330, the AP 320 does not attempt a retransmission of the frame P1. Specifically, the retransmission of the frame P1 is delayed. Since a good communication is expected, frame transmission attempts to the second host 340 and the third host 350 are tried ahead before the retransmission of the frame P1.

For example, a transmission of the frame P2 was successful in a time T1. In the exemplary embodiment of FIG. 6, the time T1 corresponds to 2 cycle delays after the transmission attempt of the frame P1 started. After the retransmission attempt of the frame P1 was a failure, the transmission of the frame P3 was successful in a time T3. In the exemplary embodiment of FIG. 6, the time T2 corresponds to 4 cycle delays since the transmission attempt of the frame P1 started. When the retransmission attempt of the frame P1 failed during the total 7 cycles, the frame P1 may be discarded in the time T3. In the exemplary embodiment of FIG. 6, the time T3 corresponds to 13 cycle delays since the transmission attempt of the frame P1 started.

Figure 1:
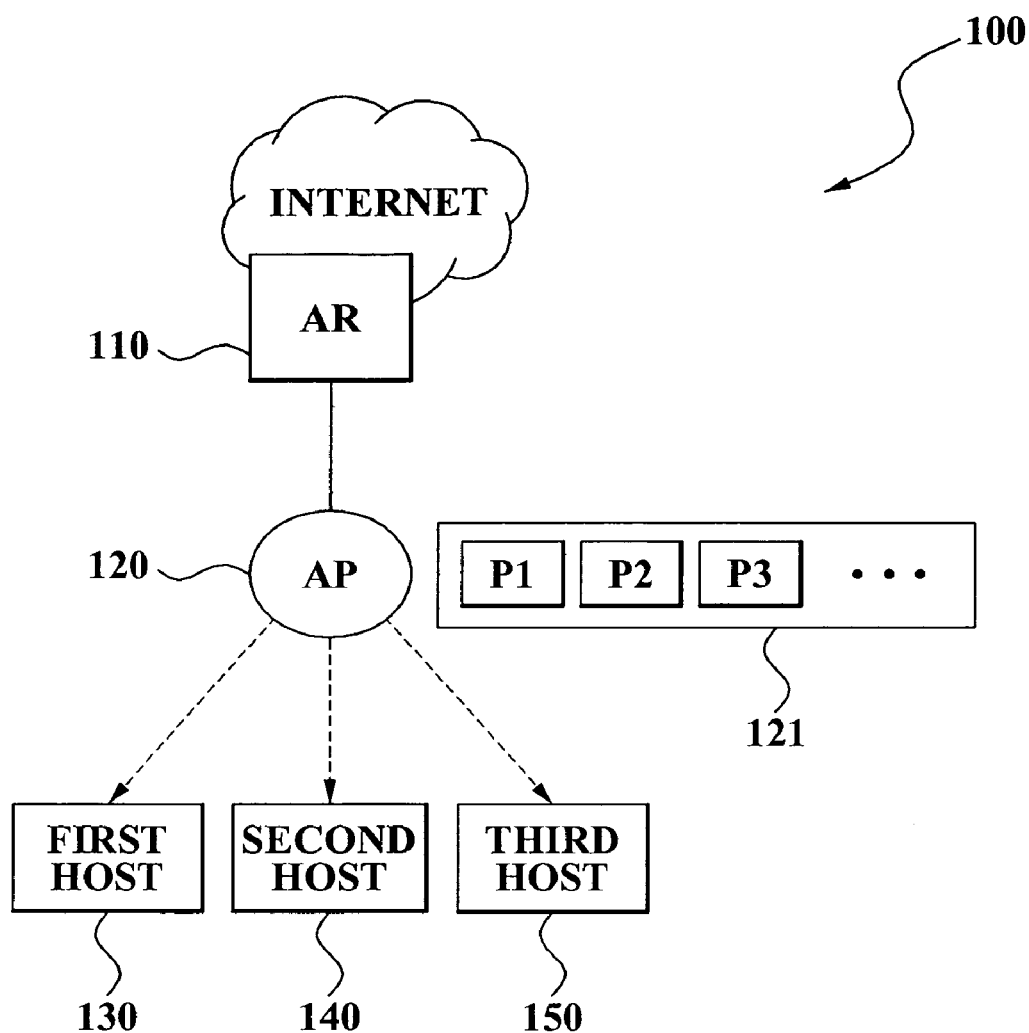
FIG. 1 is a diagram illustrating a conventional wireless communication system environment.
Figure 2:
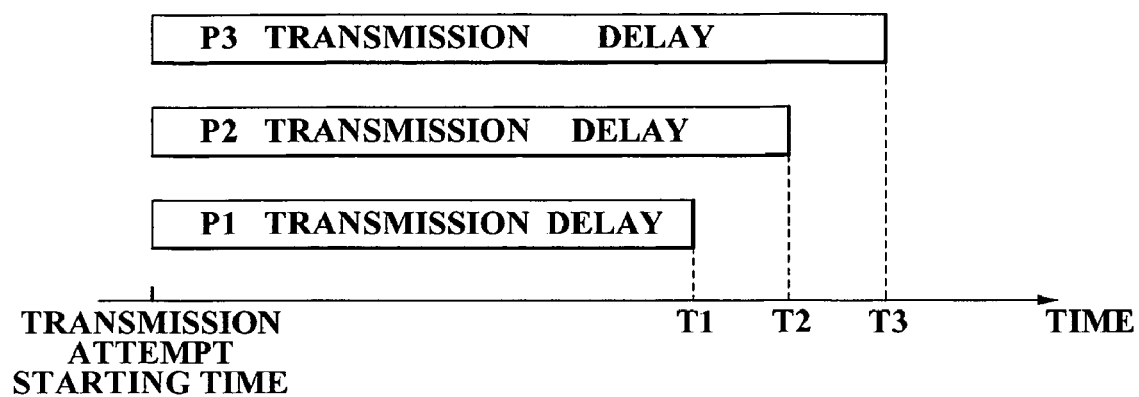
FIG. 2 is a diagram illustrating a transmission delay of a downlink frame in a base station system according to the conventional system.
Figure 6:
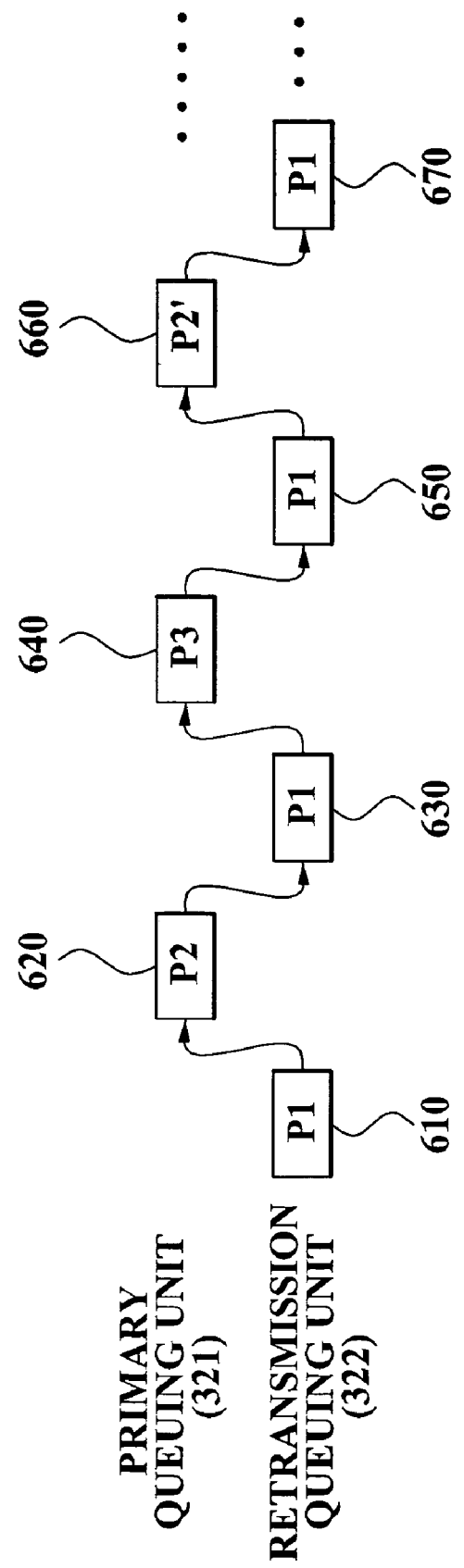
FIG. 6 is a diagram illustrating an operation of two queuing units according to an exemplary embodiment of the present invention.

According to the frame transmission method, in FIG. 6, transmission delays from a transmission attempt starting time are 13 cycles for the frame P1, 2 cycles for the frame P2, and 4 cycles for the frame P3. In this case, the average of the transmission delays is (13+2+4)/3=6.3, which indicates that the average of transmission delays are smaller than the example shown in FIG. 2. As a number of suspect destinations becomes greater, the average of the transmission delays is decreased.

As described above, when a successful transmission of the frame P1 is difficult due to a communication error or the like, the frame P1 is classified as the suspect destination, and subsequently assigned with a retransmission attempt in the retransmission queuing unit 322. In the conventional art, a frame transmission delay was increased with respect to each of the second host 340 and the third host 350 since retransmissions were continuously attempted until the frame P1 was discarded. However, according to an exemplary embodiment of the present invention, frames, for example, the frames P2 and P3, which have a high successful transmission probability to be transmitted to the normal destination, are ahead transmitted to the primary queuing unit 321. Accordingly, the average of the transmission delays of the frames may be reduced.

In a wireless communication system and a transmission method according to exemplary embodiments of the present invention, an AP operates two queuing units that have different priorities and thereby, postpones transmission of a frame which is predicted to have a long transmission delay. Accordingly, the average of the transmission delays of the frames may be reduced. Accordingly, a frame which is predicted to have a high successful transmission probability may be ahead transmitted. A frame which is predicted to have a low successful transmission probability may be subsequently transmitted. Accordingly, a throughput of the frames will be improved. The wireless communication system and the transmission method may be applied to a system according to at least one of IEEE 802.11, WLAN, IEEE 802.16d/e, WiBro, WiMAX, and the like.

The invention can also be embodied as computer readable codes on a computer-readable recording medium. The computer-readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves, such as data transmission through the Internet. The computer-readable recording medium can also be distributed over network coupled computer systems so that the computer-readable code is stored and executed in a distributed fashion.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A frame transmission method, comprising:
   transmitting, by a primary queuing unit, at least one frame to a normal destination;
   in response to a transmission and retransmission of the at least one frame failing, classifying the normal destination as a suspect destination;
   assigning, in the control unit, the at least one frame transmission that failed to transmit during the transmission and the retransmission to a retransmission queuing unit;
   transmitting, at the primary queuing unit, a plurality of subsequent frames to a normal destination; and
   continuously transmitting, at the retransmission queuing unit, the at least one frame to the suspect destination until the at least one frame is successfully received at the suspect destination or until a predetermined amount of transmission attempts expires,
   wherein the subsequent frame is subsequent in transmission priority to the at least one frame, the retransmission queuing unit and the primary queuing unit alternate transmission attempts during the same transmission period, and the at least one frame is discarded from the retransmission queuing unit when the frame fails to transmit to the suspect destination after a predetermined number of cycles.

2. The method of claim 1, wherein the retransmission is exhausted when a transmission of the at least one frame fails during an initial cycle and a retransmission of the at least one frame fails during a number of cycles.

3. The method of claim 1, wherein the transmission priority is determined based on a round robin method.

4. The method of claim 3, wherein the transmission priority comprises a priority in which a weight is assigned to each of the primary queuing unit and the retransmission queuing unit.

5. The method of claim 1, wherein a retransmission attempt is assigned to the frame transmitted by the primary queuing unit during a number of cycles, when the frame transmission attempt fails during an initial cycle, and
   the frame transmission attempt is assigned to the frame transmitted by the retransmission queuing unit for only one cycle.

6. The method of claim 1, wherein the frame transmission method is applied to a wireless communication system in accordance with at least one of Institute of Electrical and Electronics Engineers (IEEE) 802.11, wireless local area network (WLAN), IEEE 802.16d/e, wireless broadband Internet (WiBro), and World Interoperability for Microwave Access (WiMAX).

7. A frame transmission method, comprising:
transferring, at a first queue, at least one frame to a normal destination comprising a host which maintains a first communication;
in response to a transmission and a retransmission of the at least one frame failing, classifying the normal destination as a suspect destination and transferring the at least one frame to a second queue;
transmitting, at the first queue, subsequent frames that are subsequent in priority to the at least one frame; and
continuously transmitting, at the second queue, the at least one frame to the suspect destination until the at least on frame is successfully received a the suspect destination or until a predetermined amount of transmission attempts expires,
wherein the first queue and the second queue alternate transmission attempts during the same transmission period, and the at least one frame is discarded from the second queue when the frame fails to transmit to the suspect destination after a predetermined number of cycles.

8. The method of claim 7, wherein the frame transmission method is utilized for transmitting a downlink frame in an access point (AP).

9. The method of claim 7, wherein each of a plurality of hosts attached to an AP is classified as any one of the normal destination and the suspect destination according to whether a retransmission is exhausted.

10. The method of claim 9, wherein the retransmission is exhausted when a transmission of the at least one frame which is transferred to the first queue fails during an initial cycle and a retransmission of the at least one frame fails during a number of subsequent cycles.

11. The method of claim 7, wherein at least one frame transmission attempt is assigned to the first queue and the second queue according to a transmission priority.

12. The method of claim 11, wherein the transmission priority is determined based on a round robin method.

13. The method of claim 7, wherein a retransmission attempt is assigned to the frame managed in the first queue during a number of cycles, when the frame transmission attempt fails during an initial cycle, and
the frame transmission attempt is assigned to the frame managed in the second queue for only one cycle.

14. The method of claim 7, wherein the frame transmission method is applied to a wireless communication system in accordance with at least one of Institute of Electrical and Electronics Engineers (IEEE) 802.11, wireless local area network (WLAN), IEEE 802.16d/e, wireless broadband Internet (WiBro), and World Interoperability for Microwave Access (WiMAX).

15. A frame transmission apparatus, comprising:
a primary queuing unit for transmitting at least one frame to a normal destination comprising a host which maintains a first communication;
a processor that is configured to change the classification of a host from the normal destination to a suspect destination when the primary queuing unit unsuccessfully transmits the at least one frame a predetermined number of times, and to assign the at least one frame that is unsuccessfully transmitted to a retransmission queuing unit; and
a retransmission queuing unit for continuously transmitting the at least one frame until the at least one frame is successfully received at the suspect destination or until a predetermined amount of transmission attempts expires,
wherein the retransmission queuing unit and the primary queuing unit alternate transmission attempts during the same transmission period, and the at least one frame is discarded from the retransmission queuing unit when the flame fails to transmit to the suspect destination after a predetermined number of cycles.

16. The frame transmission apparatus of claim 15, wherein the frame transmission apparatus is utilized for transmitting a downlink frame in an access point (AP).

17. The frame transmission apparatus of claim 15, wherein the retransmission is exhausted when a transmission of the at least one frame fails during an initial cycle and a retransmission of the at least one frame fails during a number of subsequent cycles.

18. The frame transmission apparatus of claim 15, wherein the processor assigns at least one frame transmission attempt to the primary queuing unit and the retransmission queuing unit according to a transmission priority.

19. The frame transmission apparatus of claim 18, wherein the transmission priority is determined based on a round robin method.

20. The frame transmission apparatus of claim 18, wherein the transmission priority comprises a priority in which a weight is assigned to each of the primary queuing unit and the retransmission queuing unit.

21. The frame transmission apparatus of claim 15, wherein the processor assigns a retransmission attempt with respect to the frame transmitted by the primary queuing unit during a number of cycles, when the frame transmission attempt fails during an initial cycle, and assigns the transmission attempt to the frame transmitted by the retransmission queuing unit for only one cycle.

22. The frame transmission apparatus of claim 15, wherein the frame transmission apparatus is applied to a wireless communication system in accordance with at least one of Institute of Electrical and Electronics Engineers (IEEE) 802.11, wireless local area network (WLAN), IEEE 802.16d/e, wireless broadband Internet (WiBro), and World Interoperability for Microwave Access (WiMAX).

23. An apparatus for reducing a transmission delay in a wireless network, the apparatus comprising:
a primary transmission queue for transmitting a packet to a normal destination;
a processor that is configured to determine the normal destination is a suspect destination, in response to the normal destination failing to receive the packet a predetermined number of times;
the processor is further configured to assign the at least one frame transmission that failed to transmit during the transmission and the retransmission to a retransmission queuing unit;
a retransmission queue for continuously retransmitting the packet to the suspect destination until the at least one frame is successfully received at the suspect destination or until a predetermined amount of transmission attempts expires,
wherein the primary transmission queue transmits subsequent packets that are subsequent in priority to the packet while the retransmission queue continuously retransmits the packet, and the primary transmission queue and the retransmission queue alternate transmission attempts during the same transmission period.

* * * * *